United States Patent [19]

Attix

[11] Patent Number: 5,041,730
[45] Date of Patent: Aug. 20, 1991

[54] PARALLEL PLATE ION CHAMBER

[75] Inventor: Frank H. Attix, Madison, Wis.

[73] Assignee: Radiation Measurements, Inc., Madison, Wis.

[21] Appl. No.: 432,645

[22] Filed: Nov. 7, 1989

[51] Int. Cl.⁵ .................................................. G01T 1/161
[52] U.S. Cl. ........................... 250/385.1; 250/336.1; 250/374
[58] Field of Search .................. 250/336.1, 374, 375, 250/385.1, 386, 387, 389, 382

[56] References Cited

U.S. PATENT DOCUMENTS 3,987,305 10/1976 Gilbert ............................. 250/374
4,644,167 2/1987 Sorber ............................. 250/374
4,695,731 9/1987 Larkin ............................. 250/374

FOREIGN PATENT DOCUMENTS 2137747 10/1984 United Kingdom ............... 250/374

OTHER PUBLICATIONS

Biryukov et al., "A Multifilament Proportional Chamber For An Alpha Spectrograph"; Plenum Publishing Corp., 1975, pp. 408-410.
Promotional Literature for Holt Parallel-Plate Chamber.
Promotional Literature for PTW/Markus Electron Beam Chamber.
Promotional Literature for Capintec Ionization Chambers, Model PS-033 Thin Window Parallel-Plate Chamber.

*Primary Examiner*—Constantine Hannaher
*Assistant Examiner*—Edward J. Glick
*Attorney, Agent, or Firm*—Quarles & Brady

[57] ABSTRACT

An ion chamber for use with analysis and alignment of radiation therapy equipment is disclosed which includes a one millimeter deep ion chamber formed by a cavity in the front of a core member which is closed at its upper end by a thin electrode stretched and held in place over the cavity. A guard ring around the collecting electrode is maintained by a coated layer formed on the surface of the core inside of the cavity. Suitable conductive layers applied to the core connect to the various conductors of a triaxial cable so that the front electrode, the ion collecting electrode, and the guard ring electrode, can all be relatively easily connected to the single triaxial cable connected to the ion chamber. Components of the ion chamber are all, with the exception of the front electrode and the ion collecting electrode, fabricated of a single uniform material having known and defined radiation transmission properties so that radiation field discontinuities and perturbations are not generated within the instrument.

12 Claims, 2 Drawing Sheets 5,041,730

PARALLEL PLATE ION CHAMBER

FIELD OF THE INVENTION

The present invention relates to instruments for use in mapping the distribution of radiation dosages in general, and relates, in particular, to ion chambers of small size used to map the distribution of radiation produced by therapeutic devices intended to treat human cancers with high energy radiation beams.

BACKGROUND OF THE INVENTION

It is common practice in medical applications in modern science to use high-energy radiation beams for the treatment of certain human medical problems, notably malignant tumors. In utilizing high energy radiation beams on human patients it is critically important that the radiation beam be properly focused so that only the deleterious tissue is harmed. Therefore it has become the practice to develop instruments to analyze the spread and depth penetration of radiation beams so as to more clearly define what portions of human bodies placed in such beams are affected by incident high energy radiation.

It is the usual practice to map the distribution of radiation dose by putting a simulated human body in a radiation therapy device to test the radiation actually applied. Such a simulated human body is often referred to as a "phantom" and is usually filled with either water or a plastic simulating the radiation transmissive properties of the human body. It has also been necessary, however, to provide a sensor capable of accurately measuring the dose which is incident into the phantom. It has therefore been previously done in the art to use flat, pillbox-shaped ion chambers of small size. Such flat chambers are oriented perpendicular to the radiation beam and are used for measuring the dose versus depth relationship in the phantom in cases where the dose gradient is relatively steep, as is true for electron beams. The ion chambers are also used near the front phantom surface in measuring the dosage received from gamma or x-ray radiation beams in the so-called "dose build-up" region.

There exists several commercial models of such ion chambers presently available in the technology. One of the difficulties with such chambers is that they have been previously constructed of various parts which are constructed of diverse materials, having different electron scattering properties. Consequently, when such a chamber is enclosed in a water or plastic phantom and irradiated by an electron beam, the electron flux density is perturbed by the presence of the chamber, leading to erroneous measurements of the ionization or absorbed dose.

One material which has been utilized in various types of radiation phantoms is an epoxy-based plastic manufactured by Radiation Measurements, Inc., Middleton, Wis. and sold under the tradename "SOLID WATER." SOLID WATER is a material which has an x-ray or electron radiation characteristic similar to human body tissue and therefore serves suitably as a phantom. SOLID WATER is sufficiently conductive to allow electrons that reach the end of their range within it to pass easily to ground. On the other hand, it is a poor enough conductor to serve as an effective insulator to conductors placed on the surface of a solid water slab without significant leakage currents occurring between a high voltage electrode and ground.

SUMMARY OF THE PRESENT INVENTION

The present invention is summarized in that an ion chamber for the measurement of ions created by incident radiation includes a core of relatively non-conducting material, the core having formed in its upper surface an ion collecting cavity; a flexible front electrode stretched across the cavity on the core; a retaining means to hold the front electrode in place; an ion collecting electrode placed in the center of the cavity to collect ions thereon, and a conductive layer formed on the surface of the core in the cavity to serve as a third electrode in the chamber.

It is an object of the present invention to provide a very small parallel-plate ion chamber in which virtually all the parts of the ion chamber are constructed out of a homogenous material so as to minimize any radiation field discontinuities within the chamber which might limit its sensitivity or accuracy.

It is another object of the present invention to provide such an ion chamber which is easy to manufacture and efficient and economical to assemble and use.

It is another object of the present invention to provide a parallel plate ion chamber in which there is a minimal distance between the parallel plate thus improving the spatial resolution and reducing the perturbation of the electron flux crossing the chamber to assist in the overall accuracy of the device.

It is yet another object of the present invention to provide an ion chamber with a sufficient width of guard electrode to eliminate any remaining edge effects.

Other objects, advantages and features of the present invention will become apparent from the following specification when taken in conjunction with the accompanying drawings.

DETAILED DESCRIPTION OF THE PREFERRED EMBODIMENT

Figure 1:
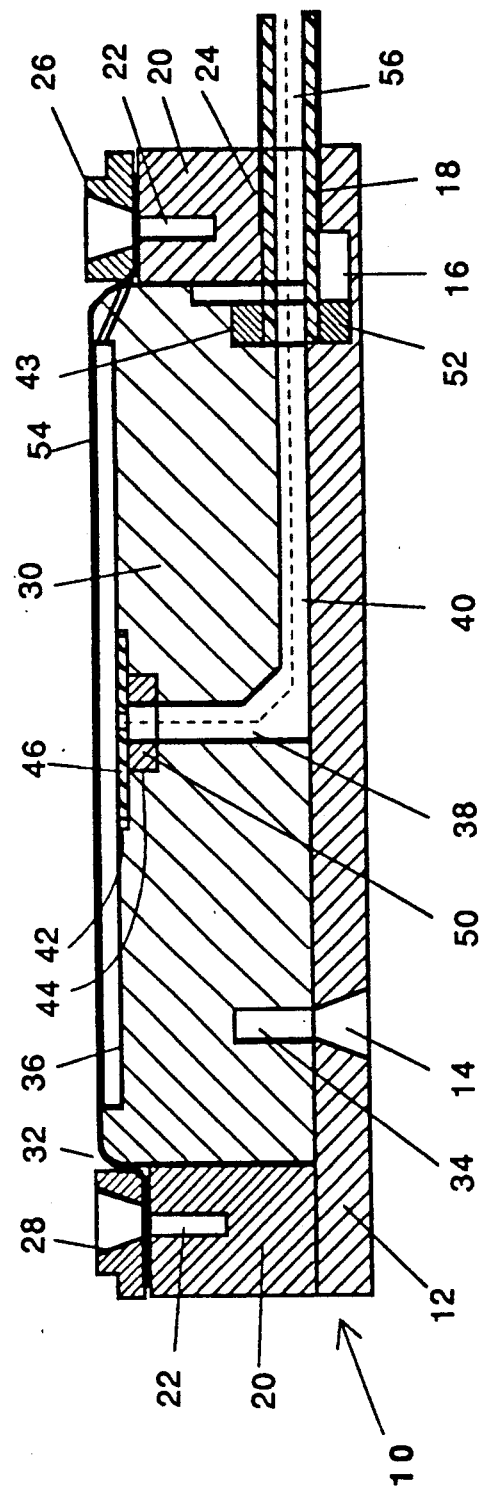
FIG. 1 is a cross-sectional view taken through an ion chamber constructed in accordance with the present invention.
Figure 2:
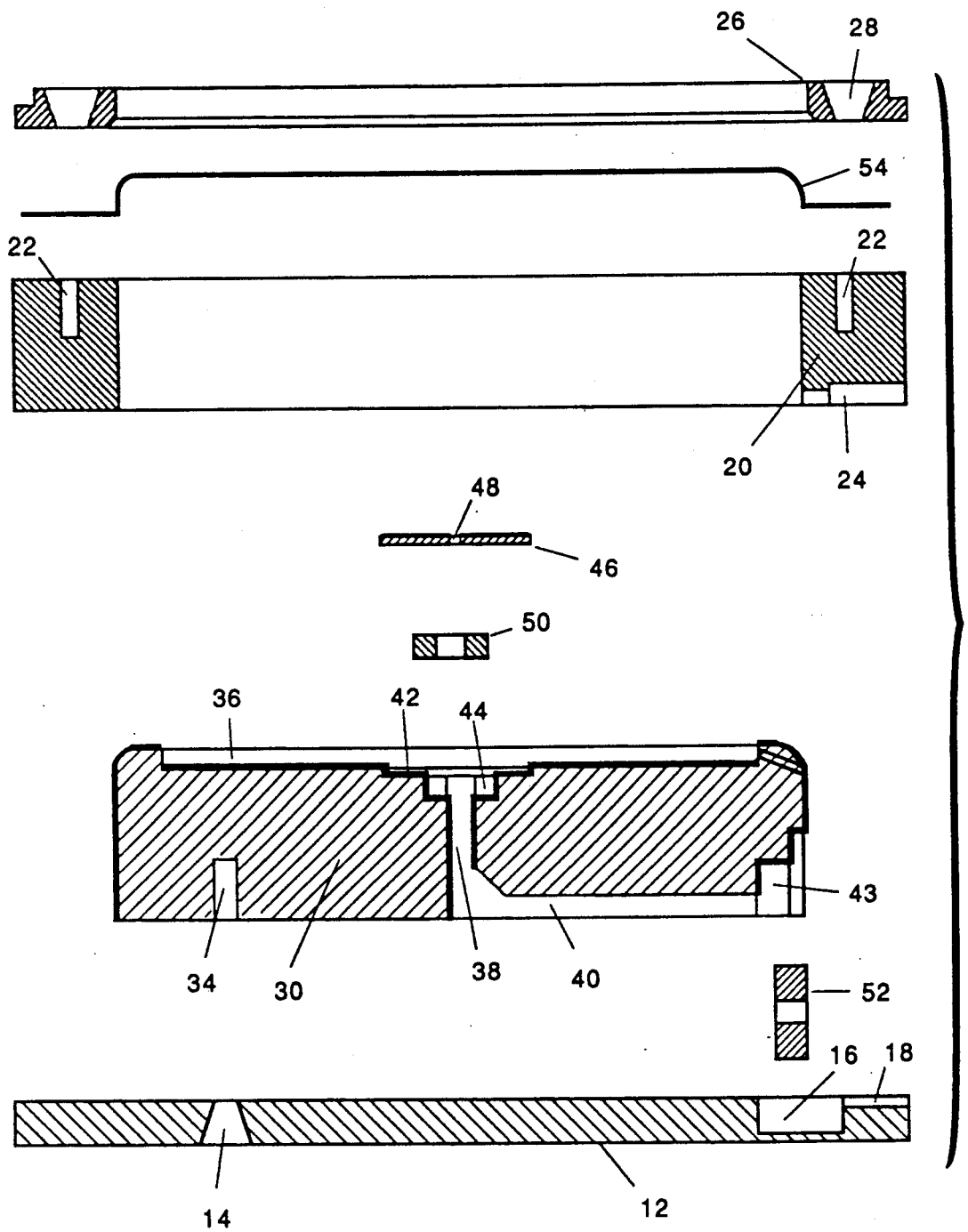
FIG. 2 is an exploded cross-sectional view of the ion chamber of FIG. 1.

Shown in FIG. 1 and illustrated at 10 is a cross-sectional side view taken through a parallel plate ion chamber constructed in accordance with the present invention. The ion chamber 10 is round, when viewed from the top, and is preferably constructed to be relatively compact in size, i.e. of a diameter of 56 to 60 millimeters. The same view of the ion chamber of FIG. 1 is also shown in FIG. 2, with the parts exploded, so that the inner relationship of the parts of the ion chamber can best be viewed by comparing FIGS. 1 and 2.

The ion chamber 10 sits upon a base 12. The base 12 is a circular disk having formed in it a series of fastener attachment holes 14, only one of which can be viewed in FIG. 1. Extending along one radial segment of the base 12 is a recess 16, and extending radially outward from the recess 16 is a cable channel 18.

A side ring 20 is an annular ring extending completely around the periphery of the ion chamber 10. On its top surfaces, the side ring 20 includes a series of threaded screw holes 22, two of which may be viewed in FIG. 1. A series of threaded screw holes (not shown) are also provided in the bottom surface of the side ring 20 corresponding to attachment holes formed in the base 12 (also not shown) so that the base 12 and the side ring 20 may also be fastened together. The side ring 20 has a generally rectangular cross section, and is sized so that its outer circumference is equal in size to the outer circumferential edge of the base plate 12. Formed on the bottom edge at one point of the side ring 20, corresponding to the cable channel 18 in the base 12, is a cable channel 24 formed in the bottom surface of the side ring 20 and extending radially therethrough.

Received above the side ring 20 is an electrode retaining ring 26. The electrode retaining ring 26 is also an annular ring and is spaced so that its larger outside circumference matches the outside circumference of the base ring 20 and the base plate 12. The electrode retaining ring 26 has a series of screw attachment holes 28 sized and arranged so as to correspond to the threaded screw holes 22 in the side ring 20. The inner surface of the foil retaining ring 26 defines a cylindrical shape. There is a chamfer, or radius on the inside lower edge of the foil retaining ring 26 at the base of that cylindrical inner surface, as can be seen in FIG. 2.

Received inside of the side ring 20 is the core 30 of the ion chamber. The core 30 is sized so as to fit inside of the side ring 20 and essentially fill up the entire interior thereof. The core 30 is generally cylindrical in shape with a flat bottom contacting the base plate 12. Along its upper edge the core 30 has a rounded upper-outer edge, indicated at 32. On its bottom surface, the core 30 has a series of threaded screw holes 34 aligned with the attachment holes 14 in the base plate 12 so that it may be attached to the base plate 12 by suitable screws (not shown). On its upper surface, the core 30 has formed into it a cylindrical depression or cavity 36, which forms the ion chamber of the device. The cavity 36 is recessed approximately 1 millimeter in depth from the uppermost face of the core 30. The cavity 36 is relatively large, having a diameter of approximately 40 millimeters. Located in the center of the cavity 36 and extending through the core 30 is a vertically extending axial cable bore 38. The cable bore 38 is located in the geometric center of the circular core 30 The axial cable bore 38 connects with a radial cable bore 40 extending radially outward along the bottom of the core 30, from the center thereof radially outward to one edge. At the outer edge of the radial cable bore 40, a recess 43 is located corresponding in location to the recess 16 formed in the base plate 12. At the bottom of the cavity 36, and around the upward terminus of the axial cable bore 38, a second smaller and shallower recess 42 is formed in the top surface of the core 30. The recess 42 is approximately 0.2 millimeters in depth. Formed in the top of the core 30 in the center of the recess 42, and also annually extending around the upper surface of the axial cable bore 40, is a second additional recess 44, which is approximately 2 millimeters in depth.

Placed within the first of the two recesses, i.e. recess 42, in the top surface of the core 30 is the ion collecting electrode 46. The ion collecting electrode 46 is a thin disk formed of non-conducting material, such as polystyrene plastic, which is sized so as to fit within the recess 42 without touching the peripheral edge thereof. The ion collecting electrode 46 has formed in its center a core hole 48. The ion collecting electrode 46 also has deposited on its upper surface a layer of graphite to provide a uniform surface of electrical conductivity all across the top surface of the ion collecting electrode 46.

By contrast, the peripheral edge of the ion collecting electrode 46 is kept free and clean of graphite, so as to insulate the top surface of the electrode 46 bearing the graphite layer, from the surrounding core 30. The center bore 48 in the ion collecting electrode disk 46 is sized so as to receive therein the terminal portion of a center conductor of a triaxial electrical cable.

Positioned in the cavity 44, under the ion collecting electrode 46 is an inner braid binding ring 50. The inner braid binding ring 50 is a cylindrical, annular member having a central core therethrough of sufficient size to receive the center conductor and center insulating layer of a triaxial electrical cable. An outer braid binding ring 52 is also provided, which is also a cylindrical, annular member, with a central cavity therethrough. The central cavity in the outer braid binding ring 52 is sized so as to receive therethrough the inner two conductors, plus both their insulating layers, of a triaxial electrical cable. The outer braid binding ring 52 is also sized so as to be received within the corresponding recesses 43 and 16 formed in the core 30 and the base plate 12, as can be viewed in FIG. 1.

A front wall electrode 54 of the ion chamber 10 stretches entirely across the top thereof. The front wall electrode 54 is preferably a thin stretched film of durable material, such as a plastic film of kapton or mylar, which can be relatively thin, e.g. 0.0005 grams per square centimeter. The front wall electrode is thinly coated on its inner surface with graphite to make the entire inner surface of the front wall electrode 54 electrically conductive.

Extending into the ion chamber 10 is a triaxial electrical cable 56. The triaxial cable has its outer insulating layer extending into the cavity formed between the base 12 and the side ring 20, and received in the cooperating cable channels 18 and 24. The outer braid of the triaxial cable extends through the outer braid ring 52 and then is splayed radially outward so as to be received between the outer braid binding ring 52 and the inner wall of the recess 43 formed in the core 30. The inner two conductors of the triaxial cable extend through the cable bores 40 and 38 up into the center of the core 30 of the ion chamber 10. The inner braid is stripped back adjacent the inner braid binding ring 50, and is splayed radially outward so as to be pinned underneath the inner braid binding ring 50 and bound between the inner braid binding ring 50 and the top of the lower recess 44. The center conductor of the triaxial cable extends, with its insulating layer, through the inner braid binding ring 50, to extend into the center of the ion collecting electrode 46, where it is placed in electrical contact with the graphite conductive layer on the top surface thereof.

The core 30 is specially coated in specific areas with conductive layers of graphite material. As can be viewed in FIG. 2, the outer peripheral edge of the cylinder of the core 30 is coated with a continuous layer of graphite that extends completely around the periphery of the core 30. This graphite layer does not extend to the edge of the ion collecting chamber 36. As can be seen by comparing FIGS. 1 and 2, this outer conductive layer therefore forms a continuous electrical path of conductivity between the inside surface of the front wall electrode 54 and the outer braid of the triaxial cable 56, which contacts the graphite layer on the inside surface of the recess 42. A second graphite coating extends throughout the bottom of the ion collecting chamber cavity 36, and then throughout the interior surfaces of the recesses 42 and 44, and down into the axial cable bore 38. This graphite layer is placed in electrical contact with the inner braid of the triaxial cable 56, which is bound between the inner braid binding ring 50, and the top surface of the cavity 44. The inner conductor of the triaxial cable 56 is, as stated, in electrical contact with the top surface of the ion collecting electrode 46, these two electrically joined surfaces not being in electrical contact with any of the conductive-coated surfaces of the core 30.

The base plate 12, the side ring 20, the electrode retaining ring 26, the core 30, and the braid binding rings 50 and 52 are all preferably formulated out of the same material. The material should have a radiation conductive profile similar to that of an animal or human body. The preferred material for all of these parts is the epoxy-base plastic known as "SOLID WATER" manufactured by Radiation Measurements, Inc. of Middleton, Wis. The material is sufficiently weakly conductive that there will be very little leakage current between the graphite layers imposed on its surface which are not in actual physical contact, such as the layers on the outside of the core 30. A preferable electrically conductive coating is the graphite coating known commercially as Aquadag.

The operation of the ion chamber 10 of FIGS. 1 and 2 can now be understood in greater detail. The ion chamber is placed at the end of the triaxial cable 56 with the conductors of the cable assembled to the various electrical surfaces of the chamber 10 as described above. The chamber can then be either used by itself or inserted into the interior of a water filled or plastic phantom representing the human body. The chamber can then be inserted into the apparatus for use in high energy radiation treatment of human beings or other entities and the regularity and dose distribution of the beam can be measured by applying the beam to the chamber.

The triaxial cable is connected at its other end to a three-terminal electrometer, with the central conductor connected to the high-impedance input, the inner braid to the low-impedance input, and the outer braid to ground. The high and low impedance circuits in the electrometer (and thus the central conductor and inner braid of the cable) are to be biased at a potential of, for example, 100 volts relative to the ground terminal (the outer braid). This establishes a uniform electric field of 100 volts per millimeter across the air gap between the front electrode and the collecting electrode, thereby providing the means for removing and measuring the ions formed in the air by the radiation.

In essence, once the beam is activated, incident radiation passes through the top surface of the ion chamber into the air-filled recess or ion cavity created by the cavity 36 in the top of the core 30 and covered by the front wall electrode 54. In that chamber, the collecting electrode is actually the top surface of the ion collecting electrode 46. The air ions collected at the ion collecting electrode ar sensed through the center conductor of the triaxial cable 56. The actual separation of the ion collecting electrode from the opposing neutral electrode, i.e. the top electrode 54, is relatively small, in this instance being approximately 1 millimeter. This improves the spatial resolution of the chamber and reduces perturbation of the electron flux crossing the chamber. These advantages lessen the so-called "edge effect" of electrons leaking into the air space from the sides thereof. It has been previously observed that this "edge effect" causes excess ionization to be measured in the dose build-up regions of certain instruments and the present design obviates such inaccurate readings.

The region of the cavity 36 radially outboard of the ion collecting electrode 46 serves, in essence, as a guard ring. By biasing of the inner braid of the triaxial cable at the same potential as the center conductor, the electrode formed along the entire bottom surface of the cavity 36 can serve as a parallel collector to ensure that stray ions are not collected at the ion collecting electrode 46. This provides a radial distance of approximately 15 millimeters outside of the ion collecting electrode 46 in which the ions formed are collected but not measured. This further eliminates any edge effects and inaccuracies with regard to measurements and dose build-up regions of radiation therapy instruments.

The front wall of the chamber is obviously relatively thin, it being formed only of the thin stretched film of the front wall electrode 54. This allows the chamber to be used very close to any flat surface that might be desired. The use of a graphite conductive layer is advantageous, as opposed to aluminum or other metallic layer, in view of the fact that the higher the atomic number of the conductive layer the greater scattering of incident electrons would be achieved thus perturbing the electron flux and leading to erroneous dose measurements. This thin front wall is, at the same time, mounted in such a way that it can be easily replaced by the user if it becomes damaged. Note that the front wall electrode 54, which is uniformly coated and thus can be supplied as a repair item, is held in place simply by the retaining ring 26 which is simply screwed into the side ring 20. Thus, to replace the front wall electrode, the screws merely need to be removed from the retaining ring 26, the front wall electrode 56 replaced, and the retaining ring 26 replaced in its original position. This provides for easy replacement on site of the most fragile component of the ion chamber thus adding to the capability and durability of the device.

Note that except for the ion collecting electrode 46 itself, which is preferably formed of polystyrene, the components consisting of the core 30, the base 10, the ring 20 and the braid retaining rings 50 and 52 are all formed of the same SOLID WATER material. The material is only very weakly conductive and serves, in essence, as a reasonably good insulator. Therefore electrons which are entering the device, such as pass through the chamber and enter the core 30, will be dissipated and not give rise to spurious electrical currents. In addition, since the device is largely fabricated of identical materials, there will not be differential fields created leading also to spurious currents which could negatively effect the accuracy of the device.

It is also worthy of note that the efficiency in the manner of assembly of the device allows the triaxial cable to be the single and sole electrical connection to the ion chamber 10 which each of the conductors of the triaxial cable being swiftly and efficiently secure into its proper location in the interior of the ion chamber 10 without the need for special connectors or other extraneous hardware.

It can thus be seen that an ion chamber is created which is both efficient to manufacture, extremely accurate in its utilization, and advantageous to use.

It is understood that the present invention is not limited to the particular embodiment disclosed and illustrated herein, but embraces all such modified forms thereof as come within the scope of the following claims.

I claim:

1. An ion chamber for the measurement of ions created by incident radiation comprising
   a disk shaped base;
   a cylindrical core secured to the base;
   an annular side ring surrounding the core and also secured to the base;
   a front electrode of flexible non-conductive material stretched across the top of the core with a conductive graphite layer applied to it;
   an annular retaining ring mounted upon the side ring and secured thereto with a peripheral portion of the front electrode therebetween to hold the front electrode in place stretched across the front of the ion chamber;
   the top of the core having a cylindrical shallow cavity formed in it so that an ion collecting cavity is defined between the top surface of the core at the bottom of the cavity and the front electrode held stretched thereabove;
   an ion collecting electrode positioned in the top of the core in the cylindrical shallow cavity;
   an electrically conductive layer formed on the surface of the core on its top surface inside the cavity; and
   electrical conductive means connecting to the front electrode, the ion collecting electrode and the conductive layer so as to accurately be able to detect radiation passing through the front electrode and incident into the ion collecting cavity.

2. An ion chamber as claimed in claim 1 wherein the base, the core, the side ring and the retaining ring are all formed of the same non-metallic material so as to minimize radiation field discontinuities and perturbations in the chamber.

3. An ion chamber as claimed in claim 1 wherein the ion collecting electrode is a disk of non-conductive material with a conductive coating applied to its upper surface.

4. An ion chamber as claimed in claim 1 wherein the electrically conductive layer is a graphite coating.

5. An ion chamber as claimed in claim 1 wherein the electrical conductive means includes a triaxial electrical cable with one conductor connecting to the ion collecting electrode, one conductor connecting to the electrically conductive layer on the surface of the core inside the cavity and one conductor connected to the front electrode.

6. An ion chamber as claimed in claim 1 wherein the depth of the cavity in the top of the core is approximately one millimeter.

7. An ion chamber as claimed in claim 6 wherein the cavity is at least approximately twenty millimeters greater in diameter than the ion collecting electrode, so that edge effect measurement errors are minimized.

8. An ion chamber as claimed in claim 1 wherein the base, the core, the side ring, and the retaining ring are all fabricated of an identical homogenous material having x-ray and electron radiation characteristics similar to a human body.

9. An ion chamber for the measurement of ions created by incident radiation comprising
   a core of non-conductive material, the core having formed in its upper surface a shallow cavity serving as an ion collecting cavity;
   a front electrode of flexible material having a conductive coating applied thereto and stretched across the top of the core so as to cover the cavity and so as to serve as the top surface of the ion chamber;
   retaining means surrounding the core and retaining the front electrode so that the front electrode is retained in place;
   a disk shaped ion collecting electrode positioned in the ion collecting cavity, the ion collecting electrode having a conductive upper surface; and
   a conductive layer formed on the surface of the cavity in the core surrounding the disk shaped electrode, the conductive surface serving as the third electrode in the ion chamber, the conductive layer being at least twice as wide as the disk shaped electrode to minimize edge effects which might lead to inaccuracies in the measurements conducted with the chamber.

10. An ion chamber as claimed in claim 9 wherein there is an axial bore in the core sized to receive an electrical cable therethrough and wherein the conductive layer on the surface of the cavity extends into the axial bore so as to electrically connect to the exterior of an electrical cable passing therethrough.

11. An ion chamber as claimed in claim 9 wherein there is another layer of electrically conductive material applied to the peripheral surface of the core and extending so that it will contact the front electrode so that electrical contact can be made with the front electrode.

12. An ion chamber as claimed in claim 9 wherein the front electrode is a thin sheet of flexible material with a conductive coating applied thereto.

* * * * *